United States Patent [19]
Ramaker et al.

[11] 3,927,513
[45] Dec. 23, 1975

[54] SAFETY SHIELD FOR ROTARY MOWER

[75] Inventors: Dudley D. Ramaker, Cedar Grove;
Roger W. Keller, Port Washington,
both of Wis.

[73] Assignee: FMC Corporation, San Jose, Calif.

[22] Filed: May 20, 1974

[21] Appl. No.: 471,270

[52] U.S. Cl................................. 56/320.1; 56/17.4
[51] Int. Cl.²......................................... A01D 75/20
[58] Field of Search............... 56/17.4, 320.1, 320.2,
56/255; 280/150 R

[56] References Cited
UNITED STATES PATENTS

| | | | |
|---|---|---|---|
| 3,727,386 | 4/1973 | Jespersen et al.................. | 56/17.4 X |
| 3,799,579 | 3/1974 | Dahl ................................. | 56/17.4 X |

*Primary Examiner*—J. N. Eskovitz
*Attorney, Agent, or Firm*—A. J. Moore; R. B. Catto; C. E. Tripp

[57] ABSTRACT

A safety shield is mounted between two laterally opposed support wheels of a rotary lawnmower to block any objects which may be hurled by the blade, and to prevent access to the blade by the operator's feet. The shield comprises a panel hung directly from the wheel axle so that vertically adjusting the housing relative to the ground does not alter the elevation of the lower edge of the panel relative to the ground. The brackets which connect the panel to the axle cause the panel to be over-balanced toward the cutting blade in contact with a fixed part of the mower housing to allow rearward swinging movement of the panel biased by gravity to absorb the energy of objects hurled by the blade, and to prevent inward movement of the panel so that there is no horizontal access past the panel to the cutting blade.

4 Claims, 7 Drawing Figures

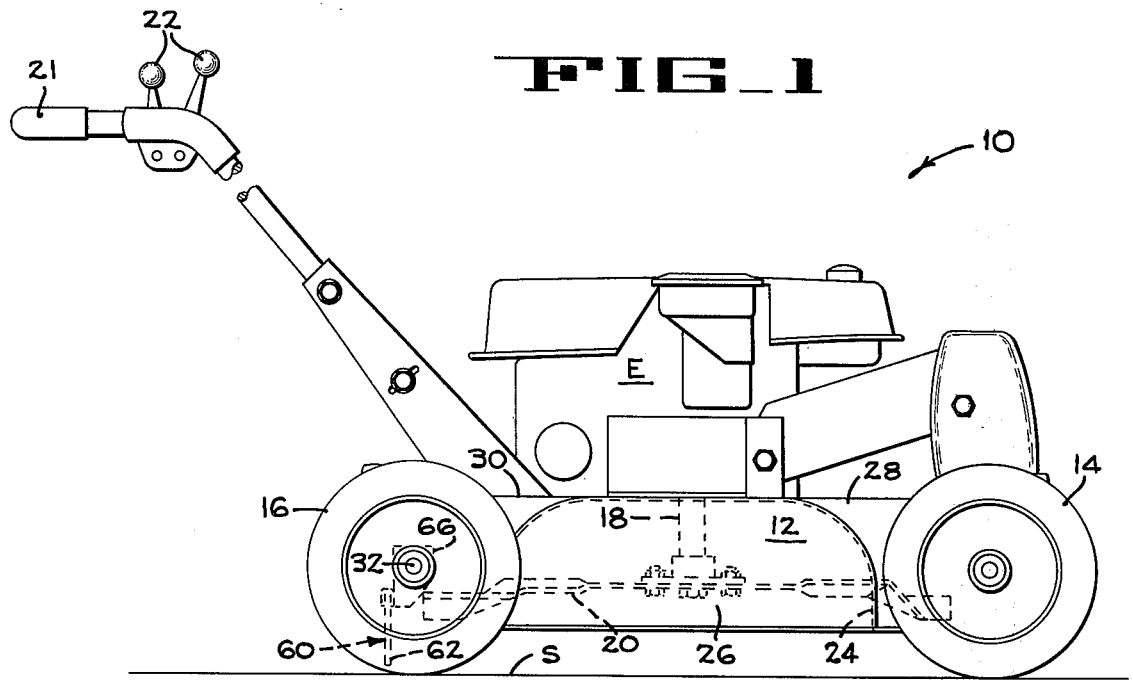
FIG_1
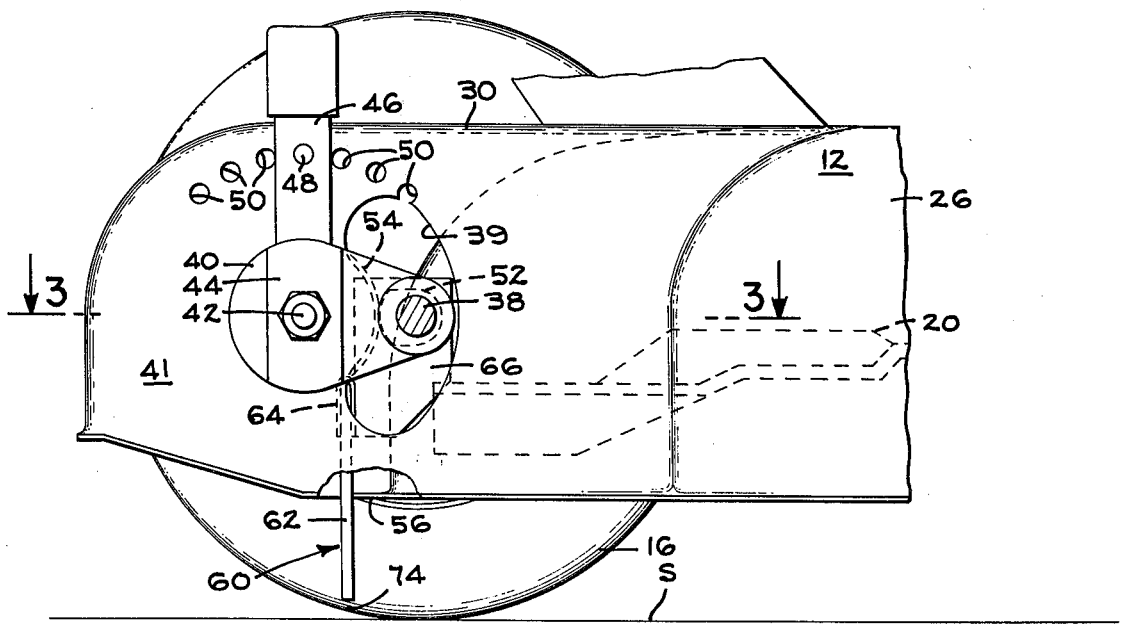
FIG_2

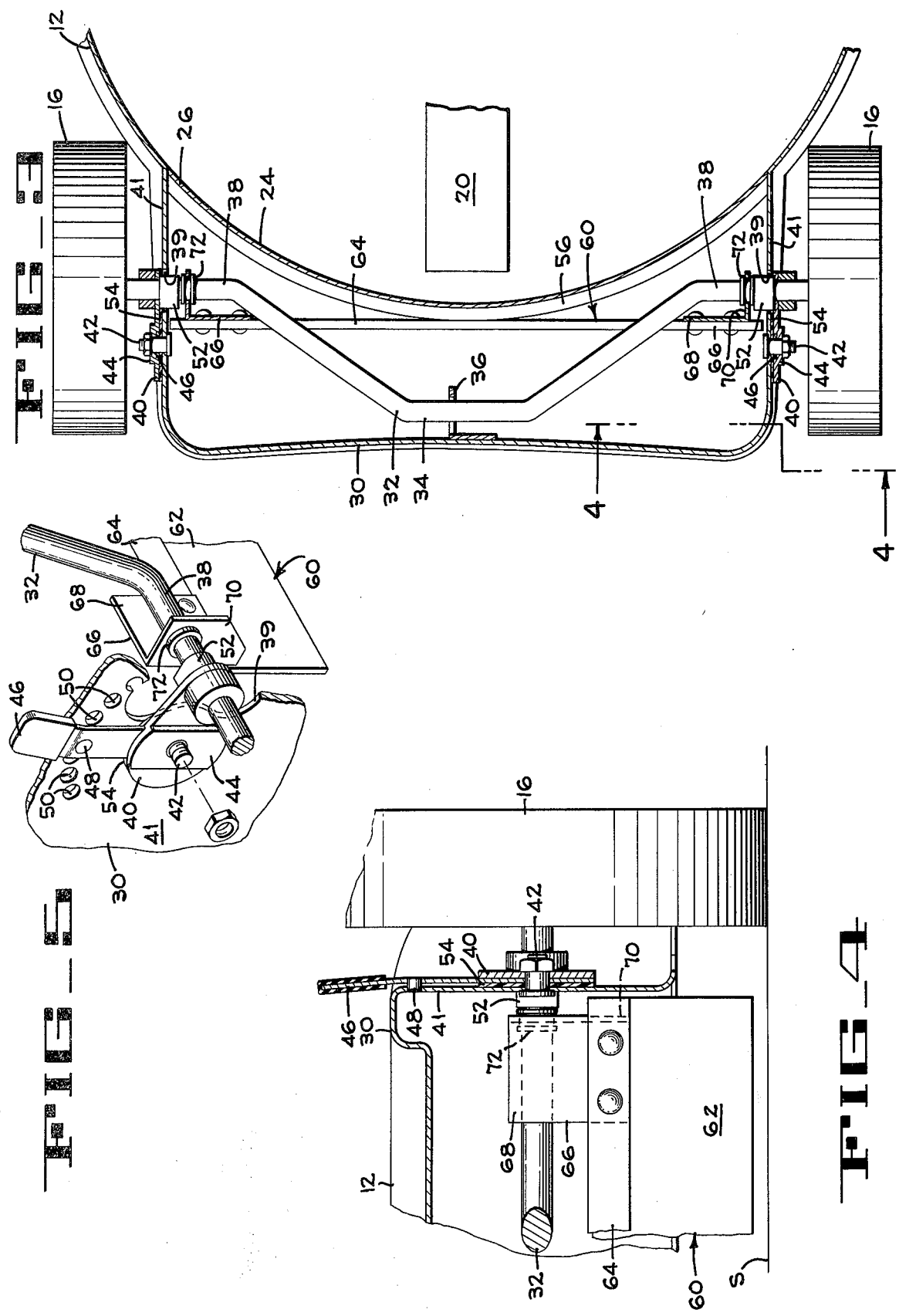

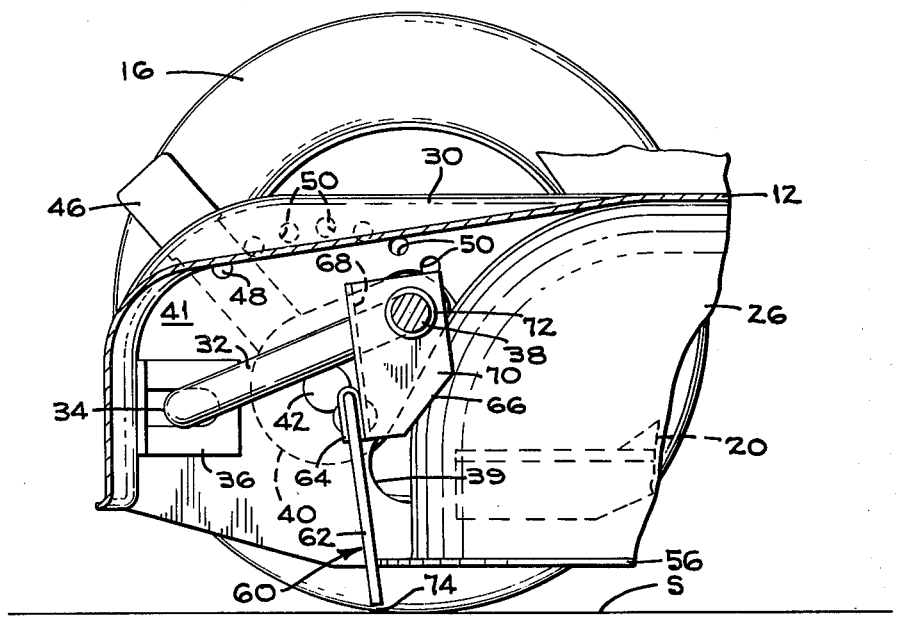
FIG_6
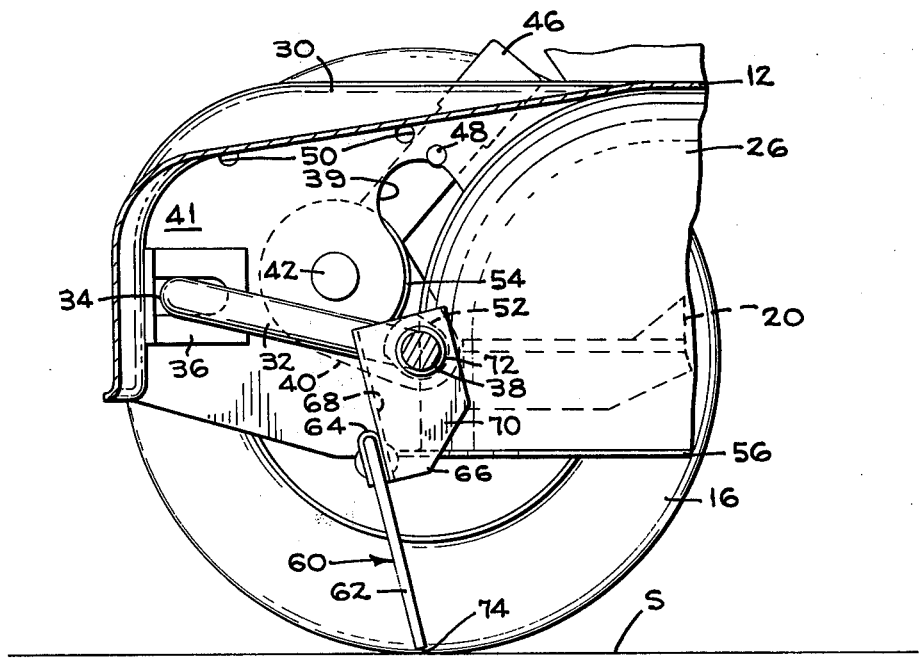
FIG_7

SAFETY SHIELD FOR ROTARY MOWER

BACKGROUND OF THE INVENTION

1. Field of the Invention

The field of the present invention concerns safety shields for rotary mowers. Such shields are now common within the industry to prevent objects which may be flung by the cutting blade from striking the operator, and to prevent the operator'feet from reaching the cutting blade.

2. Description of the Prior Art

The majority of rotary mowers for home use have the cutting blade at a fixed elevation relative to the mower housing, and the cutting blade is vertically positioned by moving the support wheels up or down relative to the housing. Thus, the gap between the housing and the ground varies according to the adjusted height of the housing.

Prior art safety shields of the type indicated are numerous, and of varying complexity. One problem which has been recognized by prior art patentees is the desirability of completely blocking access to and from the cutting blade at the trailing end of the mower where the operator guides and controls its use, regardless of the adjusted vertical position of the mower housing, because even a small object such as a nail or a pebble can inflict a painful and serious injury to the operator. Thus, it was an object of some prior art patents to provide zero clearance between the safety shield and the ground. The Gilbertson U.S. Pat. No. 3,190,061, issued June 22, 1965, discloses a mower wherein a shield is hinged to the mower housing above the plane of the cutting blade and has its trailing end supported by a roller which moves over the lawn surface. The combined shield and roller completely mask the gap which would otherwise exist between the rear end of the housing and the ground.

Another solution of the same problem is disclosed in the Dahl U.S. Pat. No. 3,577,714, issued May 4, 1971. In the patented structure, an elongate paddle wheel is suspended on pivoted swing arms from the mower housing to block the gap under the trailing end of the housing as it rolls over the lawn surface. The paddle wheel includes axially elongate radial vanes which contact the lawn surface to prevent grass stubble from raising the entire paddle wheel. In one embodiment of the invention, the paddle wheel replaces the rear support wheels for the mower housing.

In the Chapman U.S. Pat. No. 3,555,793, issued Jan. 19, 1971, the safety shield comprises a roller of large diameter hinged to the trailing end of a mower housing so that in all adjusted elevational positions of the housing, no objects can move into or out of the chamber where the cutting blade operates.

The Welsh U.S. Pat. No. 3,378,995, issued on Apr. 23, 1968, discloses a gate formed of numerous thin plates that are pivoted on a support rod rigid with swing arms pivotally mounted on the mower housing. The plates drag along the ground and cooperate with the swing arms to allow the mower direction to be changed while at the same time continuously guarding the cutting blade chamber at the trailing end adjacent the operator.

Another relatively complex safety shield is disclosed in the Dahl U.S. Pat. No. 3,524,307, issued Aug. 18, 1970. Two spaced circular, drive plates mounted on the axle of the mower are interconnected by three rods. Depending ferris-wheel fashion from each of the rods are a plurality of abutting guard plates which are maintained generally upright by gravity, and which in cooperative sets provide continuous masking of the cutter blade between the ground and the trailing end of the mower housing.

One of the currently used safety shields for a rotary mower is in the form of a resilient panel suspended from the mower housing between the two rear wheels, and is disclosed in U.S. Pat. No. 3,727,386, issued to Jespersen et al. on Apr. 17, 1973. The mower housing carrying the cutting blade is vertically adjustable relative to the axis of the wheels, and the resilient panel is constructed to vertically depend from the housing and horizontally mask the underside of the mower housing when the housing is at its uppermost adjusted position. In lower positions of the housing, the panel flexes against the lawn surface and permits moving the mower in either direction while performing its guarding function for the cutting blade. Springs reacting on the anchored upper edge of the panel bias the panel toward a vertical position.

From the foregoing summary of selected prior art safety shield devices for rotary lawnmowers, it is evident that, aside from the obvious inordinate cost of many of the devices, all of them are based upon the concept of maintaining a lower portion in, or near, engagement with the ground, an upper portion carried by the mower housing, and intermediate structure for accommodating the changes in elevation of the mower housing when the cutting height is altered. While these safety devices do effect the desired end result, all of them have lawn-contacting edges or surfaces which in operation move vertically relative to the mower housing and necessitate parts which we have discovered are non-essential to the effective functioning of a simple, inexpensive, easily installed safety shield in the form of a planar panel which will maintain an exact and minimum spacing from the lawn surface, regardless of the adjusted height of the mower housing and the cuting blade carried by the housing.

SUMMARY OF THE INVENTION

In accordance with the present invention a safety shield is suspended from the axle between two laterally opposed wheels of a rotary lawnmower. The bottom edge of the shield is closely spaced from the lawn surface and maintains that spacing, even when the mower housing and blade are vertically adjusted, because vertical adjustment of the mower housing is indepenedent of the axle and cannot affect the safety shield. By providing shield hangers which support the shield in offset depending relation from the axle, any objects hurled by the cutting blade against the shield are arrested with a high degree of efficiency because the objects must both swing and lift the shield to widen the clearance aperture between the bottom of the shield and the surface of the lawn. Due to the above indicated inventive concepts, the safety shield of the present invention fulfills its intended purpose with a minimum of parts, essentially comprising only a safety panel or shield, and two suspension brackets.

BRIEF DESCRIPTION OF THE DRAWINGS

FIG. 1 is a diagrammatic side elevation of a typical rotary lawnmower, with the operating handle partially broken away.

FIG. 2 is an enlarged side elevation of the trailing end of the mower housing shown in FIG. 1, with the near wheel removed and the mower housing and cutting blade at an intermediate adjusted elevation.

FIG. 3 is a horizontal section, at slightly reduced scale, taken along lines 3—3 on FIG. 2.

FIG. 4 is an enlarged vertical section viewed in the direction of the arrows 4—4 on FIG. 3.

FIG. 5 is an exploded fragmentary perspective of the components shown in FIG. 4.

FIGS. 6 and 7 are elevations, similar to FIG. 2, respectively showing the mower housing and cutting blade at their lowest and at the highest adjusted elevation for preselecting the cutting height.

DESCRIPTION OF THE PREFERRED EMBODIMENT

With reference to FIG. 1, a typical rotary lawnmower 10 includes a downwardly open housing 12, supported at the front and rear ends by pairs of wheels 14 and 16. An engine E is mounted atop the housing 12, and has its output shaft 18 coupled to a rotary cutting blade 20. An operator guides and controls the mower with a handlebar 21 and controls 22, but the cutting height of the blade 20 above the lawn surface S must be preset by vertically adjusting the mower housing 12 relative to the wheels 14 and 16.

One known manner of providing the cutting height adjustment, and one conventional type of mower housing are described in connection with FIGS. 2 and 3. The cutting blade 20 operates within the confines of a circular, downwardly open chamber 24 (FIG. 3) which is peripherally defined by a housing wall 26. Forward and rearward extensions or aprons 28 and 30 (FIGS. 1—3) of the housing 12 indirectly support the pairs of wheels 14 and 16, by means next described, whereby positioning of the wheels relative to the housing controls the cutting height of the cutting blade.

As best shown in FIG. 3, a rear axle 32 for the wheels 16 has a rearwardly offset portion 34 which is slidably but captively held in a slotted bracket 36 (see FIGS. 6 and 7) that is secured to the apron 30. Coaxial, straight end portions 38 of the axle 32 adjacent the wheels 16 each extend through an arcuate slot 39 formed in upright walls 41 of the apron 30, and are each supported by an arm 40 pivotally mounted to the apron 30 by a pivot bolt 42. Referring to FIG. 2, the arm 40 is formed with an axially offset portion 44 to provide a seat which rotationally locks the arm 40 to an operating handle 46 that is also mounted on the pivot bolt 42. The handle 46 can flex outward from the apron 30, and is provided with an inwardly projecting locking stud 48 that can be selectively inserted in one of an arcuate pattern of apertures 50 in the apron 30, and by this means alter the relative position of the end portion 38 of the axle 32 in the slot 39.

To facilitate smooth adjusting motion of the axle-housing relation, a nylon bushing 52 (FIG. 2) is secured to the arm 40 in sliding engagement with the edge of a nylon washer 54 (FIGS. 2 and 4) that is mounted on the pivot bolt 42 adjacent the operating handle 46. Thus, when the cutting height of the blade 20 is to be either raised or lowered from the intermediate position shown in FIG. 2, the operator grasps the handle 46 (of each wheel, in turn) and flexes it to extract the locking stud 48 from the aperture 50 with which it is engaged. The handle is then swung about the pivot bolt 42 to pivot the arm 40 which is connected to the adjacent end portion 38 of the axle. Since the elevation of the ends of the axle is maintained by the wheels, the mower housing 12 moves up and down relative to the end portion 38 of the axle, and the locking stud is inserted in another aperture 50 to complete the adjustment for that particular corner of the mower housing.

As shown in FIGS. 2 and 3, the lower trailing portion of the circular wall 26 is provided with a horizontally projecting flange 56. Contacting the flange 56, and extending upward from the lawn surface S to horizontally mask the gap at the trailing end of the housing 12 between the lawn surface S and the flange 56, is a safety shield assembly 60 which forms the subject matter of the present invention.

The safety shield 60 (FIG. 3–5) comprises an elongate, rectangular flat panel 62, preferably formed of flexible material such as fabric-reinforced belting, or vinyl plastic, which extends between the walls 41. The upper edge of the panel 62 is reinforced and weighted by a channel 64, and is at all times at a higher elevation than the housing flange 56, and each end of the channel is riveted to a hanger bracket 66. Each hanger bracket 66 is provided with perpendicular walls 68 and 70, the lower portion of the wall 70 being apertured for the axle end portion 38 and an intermediate bushing 72 (FIGS. 3 and 5) which allows free swinging movement of the bracket 66 on the axle. FIG. 5 clearly shows the interrelation of most of the components above described, and their operative relation with the offset axle 32.

It will be seen in FIGS. 6 and 7 that the safety shield panel 62 is rearwardly offset from the axle ends 38. Thus, the weight of the safety shield assembly 60 relative to its pivotal point of suspension about the axes of the axle end portions 38 biases the panel 62 toward the cutting blade 20 and into contact with the rearwardly extending portion of flange 56. It will be evident, therefore, that any foreign objects which may be hurled by the cutting blade 20 toward the operator, will tend to swing the panel 62 rearward. Due to the offset relation of the safety shield panel relative to its suspension points, the panel must also elevate as it is swung. Thus, the lifting of the safety shield assembly 60 plus the resilience of the panel 62, readily dissipate the kinetic energy of the object and eliminate its potential hazard to the operator. A further advantage of the overbalanced safety shield assembly 60 is that it is quickly restored to normal operating position solely by gravity, and need not depend on restoring springs or the like which can break or jam.

An important advantage of the safety shield assembly 60 is the substantial uniformity of the gap indicated at 74 (FIGS. 2, 6 and 7) between the lower edge of the panel 62 and the lawn surface S, regardless of the adjusted height of the cutting blade 20. By reason of the fact that the shield assembly 60 is suspended from the axle ends 38, which of course always maintain the same elevation irrespective of the adjusted position of the cutting blade 20, the lower edge of the panel 62 always automatically lies close to the lawn surface S.

From the preceding description, it is believed evident that the point of departure from prior art patents which support the safety shield from the mower housing, is that the safety shield of the present invention is hung directly from the axle, or mounted on an axis coincident with the axis of the wheels in mowers which do not have a continuous axle. By this provision, the lower edge of the safety shield is always at the same close spacing from the lawn surface except for insignificant variations due to the arcuate path of travel of the lower end of the shield, regardless of the adjusted elevation of the mower housing and the cutting blade which is carried by the housing. Allied with the same concept is that only a pivotal suspension from the axle, or wheel axis, is required for the safety shield to achieve the desired end result without requiring independent swing arms or restoring springs or the like for supporting the safety shield. By laterally offsetting the safety shield from the axle with the shield hanger brackets in the manner disclosed, it is apparent that the resistive force of the safety shield is greatly increased from the force attainable if the safety shield hung directly from the axle.

Although the best mode contemplated for carrying out the present invention has been herein shown and described, it will be apparent that modification and variation may be made without departing from what is regarded to be the subject matter of the invention.

What is claimed is:

1. In a rotary lawnmower of the type including a cutting blade within a mower housing which is vertically adjustable relative to two laterally opposed rearward ground support wheels mounted on opposite ends of transverse axle means defining the axis of rotation of said wheels, the improvement comprising:

a safety shield disposed between said opposed support wheels for blocking movement of objects therepast toward and away from the cutting blade, a rearwardly extending portion of said mower housing disposed behind said blade, means mounting said safety shield in depending relation from said axle means for pivotal movement about said axis of rotation, said safety shield having a lower edge closely spaced from the ground and maintaining said spacing regardless of the adjusted height of the mower housing by reason of its pivotal mounting on said axle means, and, said mounting means comprising a bracket rigidly secured to each end portion of said safety shield and freely pivotally mounted on said axle means, said safety shield being connected to said brackets at positions rearwardly offset from a vertical plane having said axis of rotation therein for overbalancing said safety shield causing the lower edge thereof to pivot about said rotational axis toward the cutting blade and into contact with said rearwardly extending portion of said housing disposed between said cutter blade and said shield, thereby to resist intrusion of an object toward said cutting blade and likewise said shield in being weighted toward said housing resists outward deflection by objects thrown rearwardly by said cutter blade.

2. The improvement of claim 1 wherein:

said housing includes an upright wall adjacent the inside face of each of said wheels, and, said shield comprises an elongate substantially flat panel terminating in lateral ends each adjacent a said wall.

3. The improvement of claim 1 wherein said shield includes a panel of resilient material to absorb the impact of objects thrown by said blade.

4. The improvement of claim 3 wherein said shield further includes a metal channel-like reinforcing rib secured to the upper edge portion of said panel and wherein said brackets are secured to said rib.

* * * * *